(12) United States Patent
Upstill et al.

(10) Patent No.: US 9,659,064 B1
(45) Date of Patent: May 23, 2017

(54) OBTAINING AUTHORITATIVE SEARCH RESULTS

(71) Applicant: GOOGLE INC., Mountain View, CA (US)

(72) Inventors: Trystan Upstill, Palo Alto, CA (US); Yungchun Wan, Sunnyvale, CA (US); Alexandre Kojoukhov, San Francisco, CA (US)

(73) Assignee: Google Inc., Mountain View, CA (US)

( * ) Notice: Subject to any disclaimer, the term of this patent is extended or adjusted under 35 U.S.C. 154(b) by 206 days.

(21) Appl. No.: 13/838,442

(22) Filed: Mar. 15, 2013

(51) Int. Cl.
*G06F 17/30* (2006.01)

(52) U.S. Cl.
CPC .................................. *G06F 17/3053* (2013.01)

(58) Field of Classification Search
CPC ......... G06F 17/30864; G06F 17/30867; G06F 17/30675
USPC ....................................................... 707/731
See application file for complete search history.

(56) References Cited

U.S. PATENT DOCUMENTS

| | | | | |
|---|---|---|---|---|
| 6,240,408 B1* | 5/2001 | Kaufman | ....................... | 707/730 |
| 8,396,876 B2 | 3/2013 | Kennedy et al. | | |
| 8,762,389 B1* | 6/2014 | Popovici et al. | ............. | 707/748 |
| 8,788,477 B1* | 7/2014 | Jung et al. | .................... | 707/707 |
| 8,874,558 B1* | 10/2014 | He et al. | ....................... | 707/723 |
| 2006/0106788 A1* | 5/2006 | Forrest | ............................... | 707/4 |
| 2009/0327275 A1* | 12/2009 | Walker et al. | .................... | 707/5 |
| 2011/0246456 A1* | 10/2011 | Weitz et al. | .................. | 707/724 |
| 2012/0066203 A1* | 3/2012 | Robert | ............. | G06F 17/30864 707/711 |
| 2012/0136853 A1* | 5/2012 | Kennedy et al. | ............. | 707/723 |
| 2012/0158747 A1* | 6/2012 | Satow et al. | .................. | 707/748 |
| 2012/0290553 A1* | 11/2012 | England et al. | ............. | 707/706 |
| 2013/0007587 A1* | 1/2013 | Marantz et al. | ............... | 715/234 |
| 2013/0173639 A1* | 7/2013 | Chandra | ........... | G06F 17/30864 707/754 |

FOREIGN PATENT DOCUMENTS

| | | |
|---|---|---|
| EP | 1363208 | 4/2006 |
| EP | 1859367 | 11/2007 |
| WO | WO2009085465 | 7/2009 |

\* cited by examiner

*Primary Examiner* — Scott A Waldron
*Assistant Examiner* — Dongming Wang
(74) *Attorney, Agent, or Firm* — Fish & Richardson P.C.

(57) ABSTRACT

Methods, systems, and apparatus, including computer programs encoded on computer storage media, for obtaining authoritative search results. One of the methods includes receiving a first search query. First search results responsive to the first search query are obtained. Based on the first search query or the first search results, an authoritative search result that identifies a resource on a site that is authoritative for the first search query is obtained. A ranking of the authoritative search result and the one or more first search results is generated, and the ranking of the authoritative search result and the one or more first search results is provided in response to the first search query.

20 Claims, 3 Drawing Sheets

OBTAINING AUTHORITATIVE SEARCH RESULTS

BACKGROUND

This specification relates to Internet search engines, and more particularly to ranking search results that are identified as being responsive to search queries.

Internet search engines aim to identify resources, e.g., web pages, images, text documents, multimedia content, e.g., videos, that are relevant to a user's information needs and to present information about the resources in a manner that is most useful to the user. Internet search engines generally return a set of search results, each identifying a respective resource, in response to a user submitted query.

SUMMARY

This specification describes how a system can improve search result sets by including at least one authoritative search result that identifies a resource on an authoritative site for a query. The system can include an authoritative search result, for example, when scores of an initial first search result set are low or when the query itself indicates that the user seeks resources from an authoritative site.

In general, one innovative aspect of the subject matter described in this specification can be embodied in methods that include the actions of receiving a first search query; obtaining first search results responsive to the first search query; obtaining an authoritative search result that identifies a resource on a site that is authoritative for the first search query; generating a ranking of the authoritative search result and the one or more first search results; and providing the ranking of the authoritative search result and the one or more first search results in response to the first search query. Other embodiments of this aspect include corresponding computer systems, apparatus, and computer programs recorded on one or more computer storage devices, each configured to perform the actions of the methods. A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions.

The foregoing and other embodiments can each optionally include one or more of the following features, alone or in combination. Obtaining an authoritative search result that identifies a resource on a site that is authoritative for the first search query comprises maintaining a mapping between one or more keywords and one or more authoritative sites for the keywords; and determining that a term of the first search query occurs as a keyword in the mapping. The mapping includes one or more site keywords that identify respective authoritative sites in the set of authoritative sites for the first search query. The mapping identifies one or more authoritative sites for each topic keyword. Obtaining an authoritative search result that identifies a resource on a site that is authoritative for the first search query comprises determining that fewer than a first threshold number of the first search results have respective scores that satisfy a second minimum score threshold. Obtaining an authoritative search result that identifies a resource on a site that is authoritative for the first search query comprises determining a second search query; and obtaining a second search result responsive to the second search query, wherein the second search result identifies a resource on a site that is authoritative for the first search query. Obtaining an additional search result that identifies a resource on a site that is authoritative for the first search query comprises identifying a site that is authoritative for the first search query; and obtaining search results from the site using the first query. Identifying a site that is authoritative for the first search query comprises identifying a keyword that occurs in the first search query that also occurs in a mapping between keywords and respective one or more authoritative sites; and identifying a site to which the keyword is mapped.

Particular embodiments of the subject matter described in this specification can be implemented so as to realize one or more of the following advantages. Providing users with at least one authoritative search result can make search result sets more useful and informative to users. Identifying an authoritative search result when the scores of an initial search results set are low can improve the overall quality of search results provided to a user.

The details of one or more embodiments of the subject matter of this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
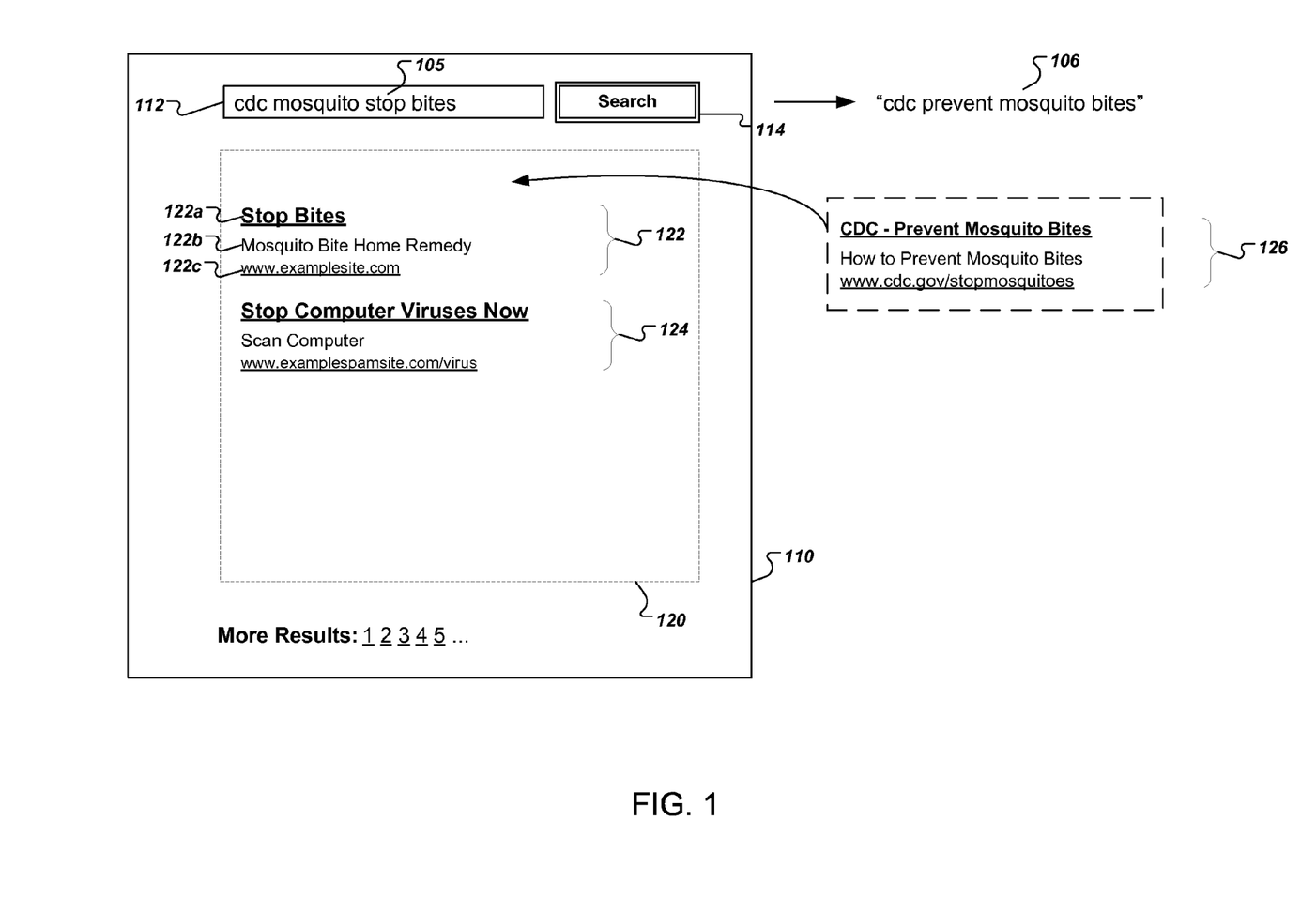
FIG. 1 is a diagram that illustrates obtaining an authoritative search result.

FIG. 1 is a diagram that illustrates obtaining an authoritative search result. FIG. 1 shows a user interface 110 of a search system. A user has entered a query 105 into a search box 112 and has initiated a search with the search system, for example, by selecting a search button 114.

In response receiving the query 105, the search system can provide one or more search results 122 and 124. The search results 122 and 124 will be ranked in an order in a search results portion 120 of the user interface 110. Each search result identifies a resource and has an associated title 122a, a text snippet 122b, and a display link 122c that shows a location of the resource.

Based on the query 105, the search results 122, 124, or both, the search system can determine that the returned search results may be improved by providing an additional search result that identifies a resource on a site that the search system deems to be authoritative for the query 105. To do so, the search system can determine a second search query 106 and obtain search results responsive to the second search query. The search system can then identify, among the search results obtained for the second search query 106, a particular search result that identifies a resource on an authoritative site for the query 105. For example, the search system can obtain search result 126 and determine that search result 126 identifies a resource on a site, "cdc.gov," that is authoritative for the query 105.

The search system can then provide the additional search result along with search results that were obtained for the original query 105. Generally, the search system will assign a score to the additional search result so that the additional search result will be ranked among a number of highest-ranked search results obtained for the original query 105. In FIG. 1, the additional search result 126 is illustrated as being inserted into the search results at the highest-ranked position. The user may thus find the provided search results more useful when they include search result 126 that identifies a resource on an authoritative site for the first query.

In general, an authoritative site is a site that the search system has determined to include particularly trusted, accurate, or reliable content. The search system can distinguish authoritative sites from low-quality sites that include resources with shallow content or that frequently include spam advertisements. Whether the search system considers a site to be authoritative will typically be query-dependent. For example, the search system can consider the site for the Centers for Disease Control, "cdc.gov," to be an authoritative site for the query "cdc mosquito stop bites," but may not consider the same site to be authoritative for the query "restaurant recommendations". A search result that identifies a resource on a site that is authoritative for the query may be referred to as an authoritative search result. The search system can determine whether to obtain an authoritative search result in response to a query in a variety of ways, which will be described below.

Figure 2:
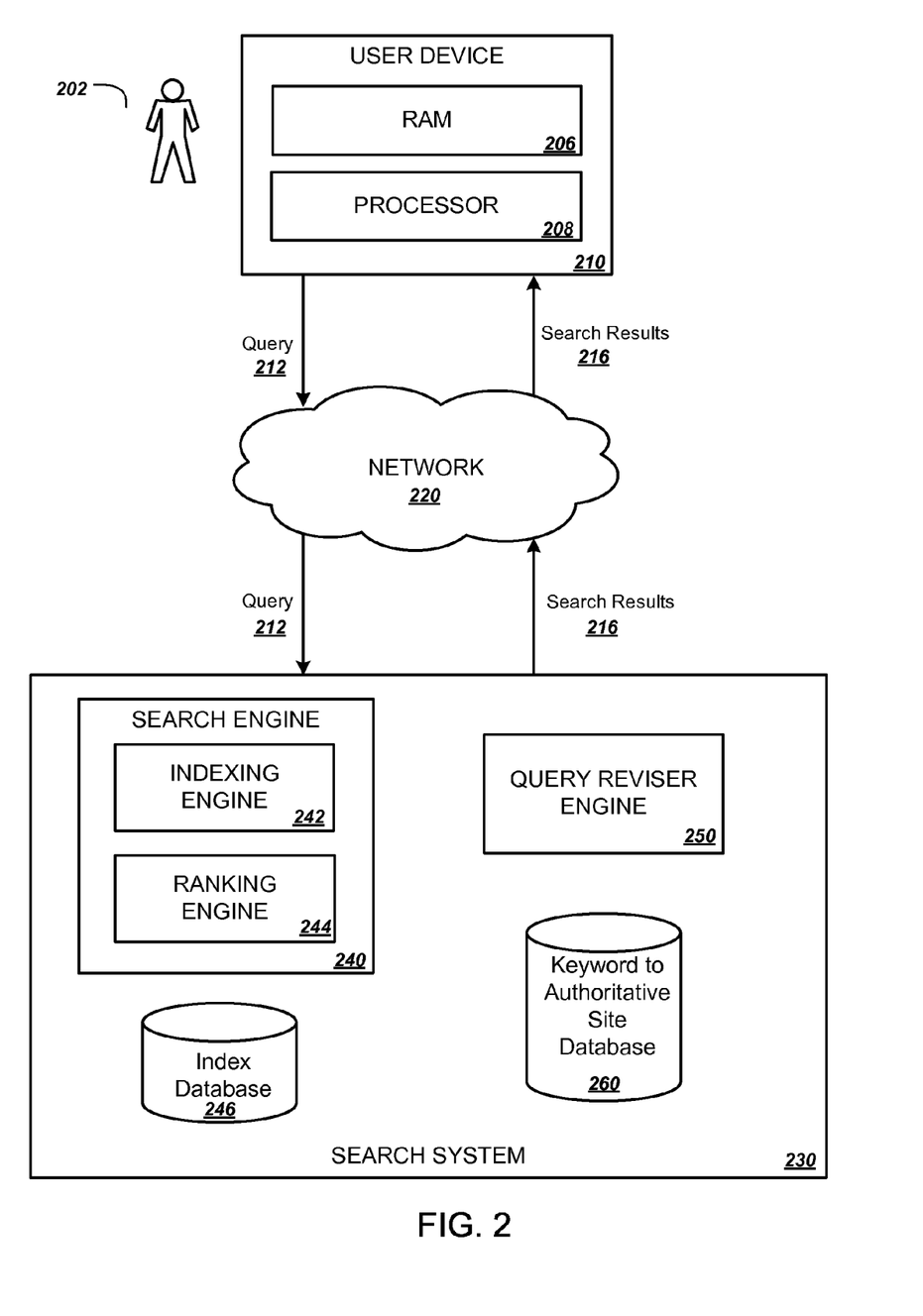
FIG. 2 is a diagram that illustrates resources visited during an example viewing session.

FIG. 2 is a diagram of an example system. The system includes a user device 210 in communication with a search system 230 over a network 220. The search system 230 is an example of an information retrieval system; the search system 230 can be implemented as one or more computer programs on one or more computers in one or more locations, in which the systems, components, and techniques described below are implemented. For example, the search system 230 can obtain search results that identify resources on authoritative sites.

A user 202 can interact with the search system 230 through a user device 210. For example, the user device 210 can be a computer coupled to the search system 230 through a data communication network 220, e.g., a local area network (LAN) or wide area network (WAN), e.g., the Internet, a wireless network, or a combination of networks.

In general, the user device 210 transmits a query 212 over the network 220 to the search system 230. The search system 230 responds to the query 212 by transmitting search results 216 to the user device 202. For example, in some implementations, the search system generates a page of search results, which the search system 230 transmits over the network 220 to the user device 210 in a form that can be presented on the user device 210, e.g., in the form of a markup language document, e.g., HyperText Markup Language or eXtensible Markup Language document, that can be displayed by a web browser running on the user device 210. The user device 210 displays the search results 216. In some implementations, the user device 210 does so by rendering the document in order to present the search results 216 on a display device that is part of or coupled to the user device 210. In some cases, the search system 230 may be partially implemented on the user device 210 itself, for example, if a user installs an application that performs searches on the user device 210.

The user device 210 can be any appropriate type of computing device, e.g., a server, a cloud client device, a mobile phone, a tablet computer, a notebook computer, a music player, an e-book reader, a laptop or desktop computer, a PDA (personal digital assistant), a smart phone, or any other stationary or portable device. The user device will generally include a processor 208 for executing program instructions and a memory, e.g., a random access memory (RAM) 206, for storing instructions and data. The memory can include both read-only and writable memory. The user device 210 generally runs an application program, e.g., a web browser, that can interact with the search system 230 to display web pages that provide a user interface to the search system 230 for the user 202 of the user device 210.

The search system 230 includes an index database 246 and a search engine 240. The index database 246 generally includes multiple collections of data, each of which may be organized and accessed differently. The search engine 240 of the search system 230 will generally include an indexing engine 242 that indexes resources, e.g., resources located on the Internet, and stores the index information in the index database 246.

When a query is received by the search engine 240, the search engine 240 searches the index database 246 to identify resources that satisfy the query. The search engine 240 will generally also include a ranking engine 244 that generates scores for the resources that satisfy the query. The search engine 240 can rank the resources, e.g., assign a sequential order in which the resources should be presented to the user 202, according to their respective scores. Like the search engine 230, the ranking engine 244 can be implemented as one or more software modules installed on one or more computers in one or more locations.

The search system 230 includes a query reviser engine 250. The query reviser engine 250 can generate one or more revised queries based on terms in the original query 212. In some implementations, the query reviser engine 250 generates a revised query by adding terms to the original query 212 using synonyms for terms in the original query 212. In other implementations, the query reviser engine 250 generates a revised query by substituting one or more other terms for corresponding terms of the original query 212.

The search system 230 also maintains a keyword-to-authoritative site database 260. The keyword-to-authoritative site database stores a mapping between keywords and authoritative sites. In other words, the search system 230 can associate each keyword in the database 260 with one or more authoritative sites. Some keywords in the database 260 may correspond to the domain or site name of an authoritative site. For example, the system can map the keyword "cdc" to a corresponding authoritative site "cdc.gov."

Keywords in the database 260 may also represent topics or categories. For example, the keyword "jobs" can be associated with one or more job searching sites, and the keyword "insurance" can be associated with one or more insurance sites. The system can generate topic keyword and category keyword mappings to authoritative sites by analyzing previous user selections of search results. If the system determines that queries that include a particular topic keyword frequently result in users navigating to resources on a particular site, the system can add a mapping from the topic keyword to the particular site to the keyword-to-authoritative site database 260.

The system can also assign respective confidence scores to authoritative sites that are associated with a keyword. In other words, a single keyword can be associated with multiple sites, and each of the multiple sites can have a respective confidence score. The confidence score can represent a likelihood that the keyword, if received in a query, refers to that authoritative site.

The system can also analyze user query refinements to generate additional topic or category keyword mappings or refine existing ones. If users frequently refine a first query that includes a particular topic keyword to a second query and then navigate to a particular site, the system can add a mapping from the topic keyword to the particular site to the keyword-to-authoritative site database 260. For example, if a user enters a first query "health lower cholesterol," and then refines the query by later issuing a second query "cdc lower cholesterol" and navigating to a resource on the site "cdc.gov," the system can add a mapping between the keyword "health" and the site "cdc.gov" to the keyword-to-authoritative site database 260. The system can use a number of observed query refinements that are followed by a navigation to a particular site as an indication of importance or authoritativeness for the particular site. The system can then assign or adjust a confidence score for a mapping from a particular keyword to the particular site.

What constitutes a site need not be determined solely by a domain name. The search system 230 can be configured to also treat different kinds of collections of resources as a site. For example, the system can treat as a site a collection of resources that are hosted on a single server. Alternatively or in addition, a site can be defined operationally as the resources in a domain, e.g., "example.com," where the resources in the domain, e.g., "host.example.com/resource1," "www.example.com/folder/resource2," or "example.com/resource3," are considered to be in the site. Alternatively or in addition, a site can be defined operationally using a subdomain, e.g., "www.example.com," where the resources in the subdomain, e.g., "www.example.com/resource1" or "www.example.com/folder/resource2," are considered to be in the site. Alternatively or in addition, a site can be defined operationally using a subdirectory, e.g., "example.com/subdirectory,", where the resources in the subdirectory, e.g., "example.com/subdirectory/resource.html," are considered to be in the site. Alternatively or in addition, the system can resources in two different domains to be in the same site if the system can determine that the domains are related, e.g., "example-us.com" and "example-eu.com".

When generating search results 216, the search system 230 can determine to include an authoritative search result for the query 212 and can include the authoritative search result among search results 216 that are provided back over the network 220 to the user device 210.

Figure 3:
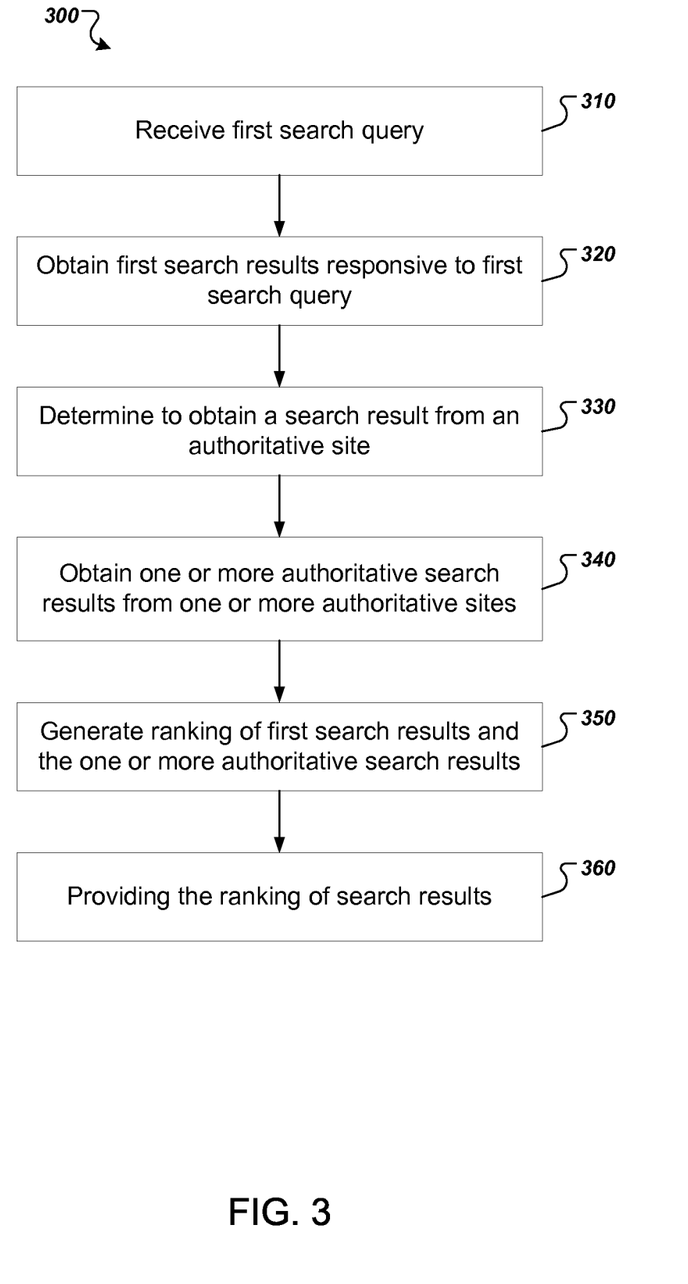
FIG. 3 is a flow chart of an example process for adjusting search result scores.

FIG. 3 is a flow chart of an example process 300 for obtaining an authoritative search result. In general, a search system receives a query, obtains initial search results for the query, and also obtains at least one authoritative search result that identifies a resource on an authoritative site for the query. The process 300 can be implemented by one or more computer programs installed on one or more computers. The process 300 will be described as being performed by a system of one or more computers, e.g., the search system 230 of FIG. 2.

The system receives a first search query (310). The system obtains first search results responsive to the first search query (320).

The system determines to obtain a search result from a site that is authoritative for the first search query (330). The system can evaluate the first search query and the first search results obtained for the first query using a variety of criteria to determine that the system should obtain a search result from a site that is authoritative for the first search query.

The system can determine to obtain an authoritative search result based on terms of the first search query that occur in a maintained mapping between keywords and authoritative sites, e.g., the keyword-to-authoritative site database 260. For example, if the system receives a query "cdc mosquito stop bites," and the keyword "cdc" is mapped to the authoritative site "cdc.gov," the system can use this information to determine to obtain an authoritative search result from the site "cdc.gov." In determining whether to obtain an authoritative search result for the first search query, the system can also consider the location of mapped keywords in the query. For example, the system can determine to obtain an additional search result from an authoritative site if the first term in the query occurs in the keyword-to-authoritative site database. This is likely to occur for example, when a user seeks search results from an authoritative site identified by the first keyword of the query.

The system can also determine to obtain an authoritative search result for the first query based on information scores, or IR scores, of a number of the highest-ranked first search results. For example, if the first search results generally do not have high IR scores, the system can determine to obtain an additional search result from an authoritative site in order to improve the search result set provided for the first search query.

The system can for example use a threshold IR score to determine to obtain an additional search result. For example, if none, or fewer than a threshold number, of the first search results do not have IR scores that satisfy the threshold IR score, the system can determine to obtain an authoritative search result for the query.

The system obtains one or more authoritative search results from one or more authoritative sites (340). To obtain an authoritative search result, the system can generate a second search query and obtain one or more second search results that satisfy the second search query. The system can then select one or more of the second search results that are authoritative search results for the first query by virtue of identifying resources on sites that are authoritative for the first search query.

In some implementations, the system obtains the second search results by performing searches with one or more second queries that are expanded versions of the first search query. The system can use the query reviser engine to generate a second query more aggressively than what is used for query revision generally. Typically, upon receiving a query, the system communicates with a query reviser engine to generate one or more revised search queries for obtaining search results. In some implementations, the query reviser engine accepts a level of aggressiveness when generating revised queries. The level of aggressiveness generally represents an extent to which the query reviser engine will include substitute terms to generate revised search queries. In some implementations, substitute terms in the system have an associated confidence score, and the query reviser engine generates a revised search query by adding or substituting a substitute term for an original term in a query if the substitute term has a confidence score that satisfies a threshold. Increasing the aggressiveness of the query reviser engine will thus result in the query reviser engine selecting substitute terms with lower confidence scores that may not satisfy the usual confidence threshold. Selecting substitute terms with lower confidence scores will typically broaden the scope of the query as well as the resulting second search results.

The system can also obtain an authoritative search result by limiting its search to only resources that are on a particular site that is authoritative for the first query. The system can use a mapped keyword in the first query to identify an authoritative site for the first query and then constrain the search only to resources on the identified authoritative site.

The system generates a ranking of the first search results and the one or more authoritative search results (350). In general, the system adds the one or more authoritative search results to the set of first search results and ranks the one or more authoritative search results and first search results so that at least some of the additional authoritative search results are likely to be within a number of the highest-ranked search results. In some implementations, the system uses the IR score of an authoritative search result for the second search query to rank the authoritative search result with the first search results. In some other implementations, the system selects an authoritative search result and rank the authoritative search result as the highest-ranked search result among the first search results.

The system can also rank an authoritative search result by computing a modified IR score for the authoritative search result. In some situations, a first IR score, if any, for the authoritative search result with respect to the first search query is likely to be low, particularly if the system determined to obtain the authoritative search result because of low IR scores in the set of first search results. A second IR score for the authoritative search result with respect to the second search query, on the other hand, may be significantly higher than any of the IR scores of the first search results. Thus, the system can scale the second IR score for the authoritative search result for ranking the authoritative search result with the first search results. The system can apply a variety of demotion or penalty factors to the second IR score in order to generate a modified IR score for the authoritative search result. The system can also limit or amplify a demotion factor based on the first IR score or based on a ratio of the first IR score and the second IR score.

In some implementations, the system computes a demotion factor that is based on a similarity score between the first search query and the second search query, with the demotion being larger if the similarity score between the queries is lower.

The system can first compute a similarity score between the first search query and the second search query. The similarity score can be based on a variety of factors. For example, the similarity score can depend on a number of terms that have been dropped or substituted to generate the second query during query revision, a respective confidence score of substitute terms used to generate the second query revision, in addition to a variety of other factors. The system can transform the similarity score into a demotion factor such that lower similarity scores result in a higher demotion factor. In some implementations, the demotion factor is a value between 0 and 1. The system can then scale the second IR score of the authoritative search result by the demotion factor, e.g., by multiplying or adding their values together.

The system can also compute a demotion factor that is based on a confidence score of the authoritative site, e.g. as stored by keyword-to-authoritative site database 260. The system can apply a larger demotion to an authoritative search result that is located on an authoritative site with a lower confidence score, and a smaller demotion to an authoritative search result that is located on an authoritative site with a higher confidence score.

The system provides the ranking of search results (360). After generating a ranking of the first search results with the authoritative search result included, the system can provide the ranking of search results in response to the first search query. For example, the system can generate a search results page and provide the search results page over a network to a user that submitted the first search query.

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non-transitory program carrier for execution by, or to control the operation of, data processing apparatus. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. The computer storage medium can be a machine-readable storage device, a machine-readable storage substrate, a random or serial access memory device, or a combination of one or more of them. The computer storage medium is not, however, a propagated signal.

The term "data processing apparatus" encompasses all kinds of apparatus, devices, and machines for processing data, including by way of example a programmable processor, a computer, or multiple processors or computers. The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, or a combination of one or more of them.

A computer program (which may also be referred to or described as a program, software, a software application, a module, a software module, a script, or code) can be written in any form of programming language, including compiled or interpreted languages, or declarative or procedural languages, and it can be deployed in any form, including as a stand-alone program or as a module, component, subroutine, or other unit suitable for use in a computing environment. A computer program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub-programs, or portions of code. A computer program can be deployed to be executed on one computer or on multiple computers that are located at one site or distributed across multiple sites and interconnected by a communication network.

As used in this specification, an "engine," or "software engine," refers to a software implemented input/output system that provides an output that is different from the input. An engine can be an encoded block of functionality, such as a library, a platform, a software development kit ("SDK"), or an object. Each engine can be implemented on any appropriate type of computing device, e.g., servers, mobile phones, tablet computers, notebook computers, music players, e-book readers, laptop or desktop computers, PDAs, smart phones, or other stationary or portable devices, that includes one or more processors and computer readable media. Additionally, two or more of the engines may be implemented on the same computing device, or on different computing devices.

The processes and logic flows described in this specification can be performed by one or more programmable computers executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application-specific integrated circuit).

Computers suitable for the execution of a computer program include, by way of example, can be based on general or special purpose microprocessors or both, or any other kind of central processing unit. Generally, a central processing unit will receive instructions and data from a read-only memory or a random access memory or both. The essential elements of a computer are a central processing unit for performing or executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer-readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

While this specification contains many specific implementation details, these should not be construed as limitations on the scope of any invention or of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain implementations, multitasking and parallel processing may be advantageous.

What is claimed is:

1. A computer-implemented method comprising:
    maintaining, by a search system, a mapping from keywords to respective authoritative sites, wherein a site is a collection of resources on the Internet, and wherein the mapping identifies, for each keyword, one or more authoritative sites on the Internet for queries having the keyword, and wherein the authoritative sites for a keyword are sites that the search system has determined are authoritative for the keyword;
    receiving, by the search system, a first search query;
    obtaining, by the search system, first search results responsive to the first search query;
    determining, by the search system, after obtaining the first search results, that the search system should obtain a search result from a site that is authoritative for the first search query, and that a first authoritative site is authoritative for the first search query;

in response to the determining, performing, by the search system, a second search limited to resources occurring on the first authoritative site, using a second search query different from the first search query, to obtain an authoritative search result, the authoritative search result being a search result that identifies a resource that is responsive to the second search query and that is on the first authoritative site;

ranking, by the search system, search results including the authoritative search result and the first search results; and providing, by the search system, the ranked search results including the authoritative search result and one or more of the first search results in response to the first search query.

2. The method of claim 1, wherein the mapping includes one or more site name keywords, each site name keyword being a name of a respective site, that correspond to respective domain names of respective authoritative sites for the first search query.

3. The method of claim 1, wherein the mapping includes one or more topic keywords that identify respective topics, and wherein the mapping identifies one or more authoritative sites for each topic keyword.

4. The method of claim 1, wherein determining that the search system should obtain a search result from a site that is authoritative comprises:
computing how many of the first search results have respective information retrieval (IR) scores that are above an IR score threshold; and
determining that fewer than a threshold number of the first search results have respective IR scores that are above the IR score threshold,
wherein obtaining an authoritative search result comprises obtaining the authoritative search result to improve the search results provided in response to the first search query in response to determining that fewer than the threshold number of the first search results have respective IR scores that are above the IR score threshold.

5. The method of claim 1, comprising:
identifying one or more additional substitute terms that were not used to obtain the first search results; and
generating the second search query including adding the one or more additional substitute terms to the first search query.

6. The method of claim 5, wherein identifying the one or more additional substitute terms comprises:
identifying one or more additional substitute terms that have lower confidence scores than any of one or more original substitute terms used to obtain the first search results.

7. A system comprising:
one or more computers and one or more storage devices storing instructions that are operable, when executed by the one or more computers, to cause the one or more computers to perform operations comprising:
maintaining a mapping from keywords to respective authoritative sites, wherein a site is a collection of resources on the Internet, and wherein the mapping identifies, for each keyword, one or more authoritative sites on the Internet for queries having the keyword, and wherein the authoritative sites for a keyword are sites that a search system comprising the one or more computers has determined are authoritative for the keyword;
receiving a first search query;
obtaining first search results responsive to the first search query;
determining, after obtaining the first search results, that the search system should obtain a search result from a site that is authoritative for the first search query, and that a first authoritative site is authoritative for the first search query;
in response to the determining, performing a second search limited to resources occurring on the first authoritative site, using a second search query different from the first search query, to obtain an authoritative search result, the authoritative search result being a search result that identifies a resource that is responsive to the second search query and that is on the first authoritative site;
ranking search results including the authoritative search result and the first search results; and
providing the ranked search results including the authoritative search result and one or more of the first search results in response to the first search query.

8. The system of claim 7, wherein the mapping includes one or more site name keywords, each site name keyword being a name of a respective site, that correspond to respective domain names of respective authoritative sites for the first search query.

9. The system of claim 7, wherein the mapping includes one or more topic keywords that identify respective topics, and wherein the mapping identifies one or more authoritative sites for each topic keyword.

10. The system of claim 7, wherein determining that the search system should obtain a search result from a site that is authoritative compromises:
computing how many of the first search results have respective information retrieval (IR) scores that are above an IR score threshold; and
determining that fewer than a threshold number of the first search results have respective IR scores that are above the IR score threshold,
wherein obtaining an authoritative search result comprises obtaining the authoritative search result to improve the search results provided in response to the first search query in response to determining that fewer than the threshold number of the first search results have respective IR scores that are above the IR score threshold.

11. The system of claim 7, wherein the operations comprise:
identifying one or more additional substitute terms that were not used to obtain the first search results; and
generating the second search query including adding the one or more additional substitute terms to the first search query.

12. The system of claim 11, wherein identifying the one or more additional substitute terms comprises:
identifying one or more additional substitute terms that have lower confidence scores than any of one or more original substitute terms used to obtain the first search results.

13. The method of claim 1, further comprising:
assigning a score to the authoritative search result so that the authoritative search result is ranked among a number of highest-ranked first search results.

14. The system of claim 7, further comprising:
assigning a score to the authoritative search result so that the authoritative search result is ranked among a number of highest-ranked first search results.

15. The method of claim 1, wherein determining that the search system should obtain a search result from a site that is authoritative comprises:
  determining that a query term of the first search query occurs as a first keyword in the mapping and that the mapping maps the first keyword to the first authoritative site.

16. The method of claim 1, wherein determining that the search system should obtain a search result from a site that is authoritative comprises:
  determining that a query term located first in the first search query occurs as a first keyword in the mapping and that the mapping maps the first keyword to the first authoritative site.

17. The method of claim 1, wherein the second search query is broader version of the first search query.

18. The method of claim 1, further comprising:
  in response to the determining, obtaining, by the search system, second search results from one or more authoritative sites that are authoritative for the first search query, by performing searches limited to authoritative sites with one or more second queries that are expanded versions of the first search query;
  ranking, by the search system, the second search results and the first search results; and
  providing, by the search system, the ranked search results including one or more of the second search results and one or more of the first search results in response to the first search query.

19. The system of claim 7, wherein the operations comprise:
  in response to the determining, obtaining second search results from one or more authoritative sites that are authoritative for the first search query, by performing searches limited to authoritative sites with one or more second queries that are expanded versions of the first search query;
  ranking the second search results and the first search results; and
  providing the ranked search results including one or more of the second search results and one or more of the first search results in response to the first search query.

20. One or more non-transitory computer-readable storage media encoded with instructions that, when executed by one or more computers, cause the one or more computers to perform operations comprising:
  maintaining a mapping from keywords to respective authoritative sites, wherein a site is a collection of resources on the Internet, and wherein the mapping identifies, for each keyword, one or more authoritative sites on the Internet for queries having the keyword, and wherein the authoritative sites for a keyword are sites that a search system comprising the one or more computers has determined are authoritative for the keyword;
  receiving a first search query;
  obtaining first search results responsive to the first search query;
  determining, after obtaining the first search results, that the search system should obtain a search result from a site that is authoritative for the first search query, and that a first authoritative site is authoritative for the first search query;
  in response to the determining, performing a second search limited to resources occurring on the first authoritative site, using a second search query different from the first search query, to obtain an authoritative search result, the authoritative search result being a search result that identifies a resource that is responsive to the second search query and that is on the first authoritative site;
  ranking search results including the authoritative search result and the first search results; and
  providing the ranked search results including the authoritative search result and one or more of the first search results in response to the first search query.

* * * * *